(12) United States Patent
Koganezawa (10) Patent No.: US 8,111,347 B2
(45) Date of Patent: Feb. 7, 2012

(54) LIQUID CRYSTAL DISPLAY DEVICE

(75) Inventor: Nobuyuki Koganezawa, Chiba (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 186 days.

(21) Appl. No.: 12/699,100

(22) Filed: Feb. 3, 2010

(65) Prior Publication Data

US 2010/0195040 A1    Aug. 5, 2010

(30) Foreign Application Priority Data

Feb. 4, 2009   (JP) ................. 2009-023713

(51) Int. Cl.
   *G02F 1/1339*  (2006.01)
(52) U.S. Cl. ............... 349/58; 349/153; 349/158
(58) Field of Classification Search ............ 349/58, 349/150, 153, 158, 200
   See application file for complete search history.

(56) References Cited

U.S. PATENT DOCUMENTS

| | | | |
|---|---|---|---|
| 2007/0146616 A1* | 6/2007 | Nouchi et al. | 349/155 |
| 2010/0073593 A1* | 3/2010 | Sasaki et al. | 349/58 |

FOREIGN PATENT DOCUMENTS

| | | |
|---|---|---|
| JP | 2003-280548 | 10/2003 |
| JP | 2004-354468 | 12/2004 |
| JP | 2008-175914 | 7/2008 |

\* cited by examiner

*Primary Examiner* — David Nelms
*Assistant Examiner* — Tai Duong
(74) *Attorney, Agent, or Firm* — Antonelli, Terry, Stout & Kraus, LLP.

(57) ABSTRACT

A liquid crystal display device which can prevent lowering of characteristics thereof when a liquid crystal display panel is bent is provided. A liquid crystal display device includes: a bent liquid crystal display panel which includes a first substrate and a second substrate which are fixed to each other by a sealing material, and liquid crystal which is hermetically filled in a space defined between the first substrate and the second substrate; and pressing members which press the first substrate and the second substrate in the direction that the first substrate and the second substrate come closer to each other. The liquid crystal display panel includes a straight line on a surface thereof and is bent along a bent line which surrounds an axis arranged parallel to the straight line. The sealing material includes non-bent portions which extend along the straight line and are not bent, and bent portions which extend along the bent line. The pressing members press the first substrate and the second substrate in regions defined between the non-bent portions of the sealing material and a display region of the liquid crystal display panel.

6 Claims, 8 Drawing Sheets

LIQUID CRYSTAL DISPLAY DEVICE

CLAIM OF PRIORITY

The present application claims priority from Japanese application serial No. 2009-23713, filed on Feb. 4, 2009, the content of which is hereby incorporated by reference into this application.

BACKGROUND OF THE INVENTION

1. Field of the Invention

The present invention relates to a liquid crystal display device.

2. Description of the Related Art

A liquid crystal display panel can be bent by making a glass substrate thin (see JP-A-2003-280548(patent document 1)). A first glass substrate and a second glass substrate which face each other in an opposed manner have edge portions of opposing surfaces thereof firmly fixed to each other by a sealing material. Accordingly, when the first glass substrate and the second glass substrate are bent such that an outer surface of the first glass substrate forms a convex surface and an outer surface of the second glass substrate forms a concave surface, a tensile strength is applied to the first glass substrate and a compressive strength is applied to the second glass substrate. Here, the outer surface of the second glass substrate has a projecting portion which projects outward for releasing a compressive stress. Due to the presence of the projecting portion, a distance between the opposing surfaces of the first glass substrate and the second glass substrate is increased and this increase of the distance adversely affects characteristics of the liquid crystal display panel.

JP-A-2004-354468 (patent document 2) discloses a method where a substrate is held in a bent state and a sealing material is hardened by radiating ultraviolet rays to the sealing material in such a state. Further, JP-A-2008-175914 (patent document 3) discloses a method where a substrate is bent by heating the substrate at a temperature where a sealing material is softened.

SUMMARY OF THE INVENTION

In carrying out the methods disclosed in patent documents 2 and 3, it is necessary to perform a substrate bending step and a sealing material hardening or softening step simultaneously and hence, there has been a demand for overcoming complicated steps or the improvement of a manufacturing device.

It is an object of the present invention to provide a liquid crystal display device which can prevent lowering of characteristics of the liquid crystal display device when a liquid crystal display panel is bent.

(1) According to one aspect of the present invention, there is provided a liquid crystal display device which includes: a bent liquid crystal display panel which includes a first substrate and a second substrate which are fixed to each other by a sealing material, and liquid crystal which is hermetically filled in a space defined between the first substrate and the second substrate; and pressing members which press the first substrate and the second substrate in the direction that the first substrate and the second substrate come closer to each other, wherein the liquid crystal display panel includes a straight line on a surface thereof and is bent along a bent line which surrounds an axis arranged parallel to the straight line, the sealing material includes non-bent portions which extend along the straight line and are not bent, and bent portions which extend and are bent along the bent line, and the pressing members press the first substrate and the second substrate in regions defined between the non-bent portions of the sealing material and a display region of the liquid crystal display panel. According to the present invention, the pressing members press the first substrate and the second substrate in the regions near the sealing material and hence, it is possible to prevent lowering of characteristics of the liquid crystal display device when the liquid crystal display panel is bent.

(2) In the liquid crystal display device having the constitution (1), the pressing member may include: a plurality of first contact portions which are brought into contact with the first substrate; a plurality of second contact portions which are brought into contact with the second substrate; and a support portion which supports the plurality of first contact portions and the plurality of second contact portions.

(3) In the liquid crystal display device having the constitution (2), each one of the plurality of first contact portions and each one of the plurality of second contact portions may have a projection shape.

(4) In the liquid crystal display device having the constitution (2), each one of the plurality of first contact portions and each one of the plurality of second contact portions may have a projecting ridge shape.

(5) In the liquid crystal display device having any one of the constitutions (2) to (4), the support portion may include: a first support portion which faces the first substrate in an opposed manner by way of the plurality of first contact portions; a second support portion which faces the second substrate in an opposed manner by way of the plurality of second contact portions; and a connection portion which connects the first support portion and the second support portion with a pressing force applied in the direction that first support portion and the second support portion come closer to each other, and a thermal expansion coefficient of the plurality of first contact portions and the plurality of second contact portions may be set larger than a thermal expansion coefficient of the connection portion.

(6) In the liquid crystal display device having any one of the constitutions (1) to (5), the liquid crystal display device may further include a flexible printed circuit board which is mounted on the liquid crystal display panel, and the pressing member may have holes for preventing the pressing member from pressing the flexible printed circuit board.

BRIEF DESCRIPTION OF THE DRAWINGS

FIG. 3A and FIG. 3B are views showing a first pressing member, wherein

FIG. 4A and FIG. 4B are views showing a second pressing member, wherein

FIG. 8A and FIG. 8B are views showing a first pressing member according to a modification of the present invention, wherein

FIG. 9A and FIG. 9B are views showing a second pressing member according to a modification of the present invention, wherein

DESCRIPTION OF THE PREFERRED EMBODIMENTS

Hereinafter, embodiments of the present invention are explained in conjunction with drawings.

Figure 1:
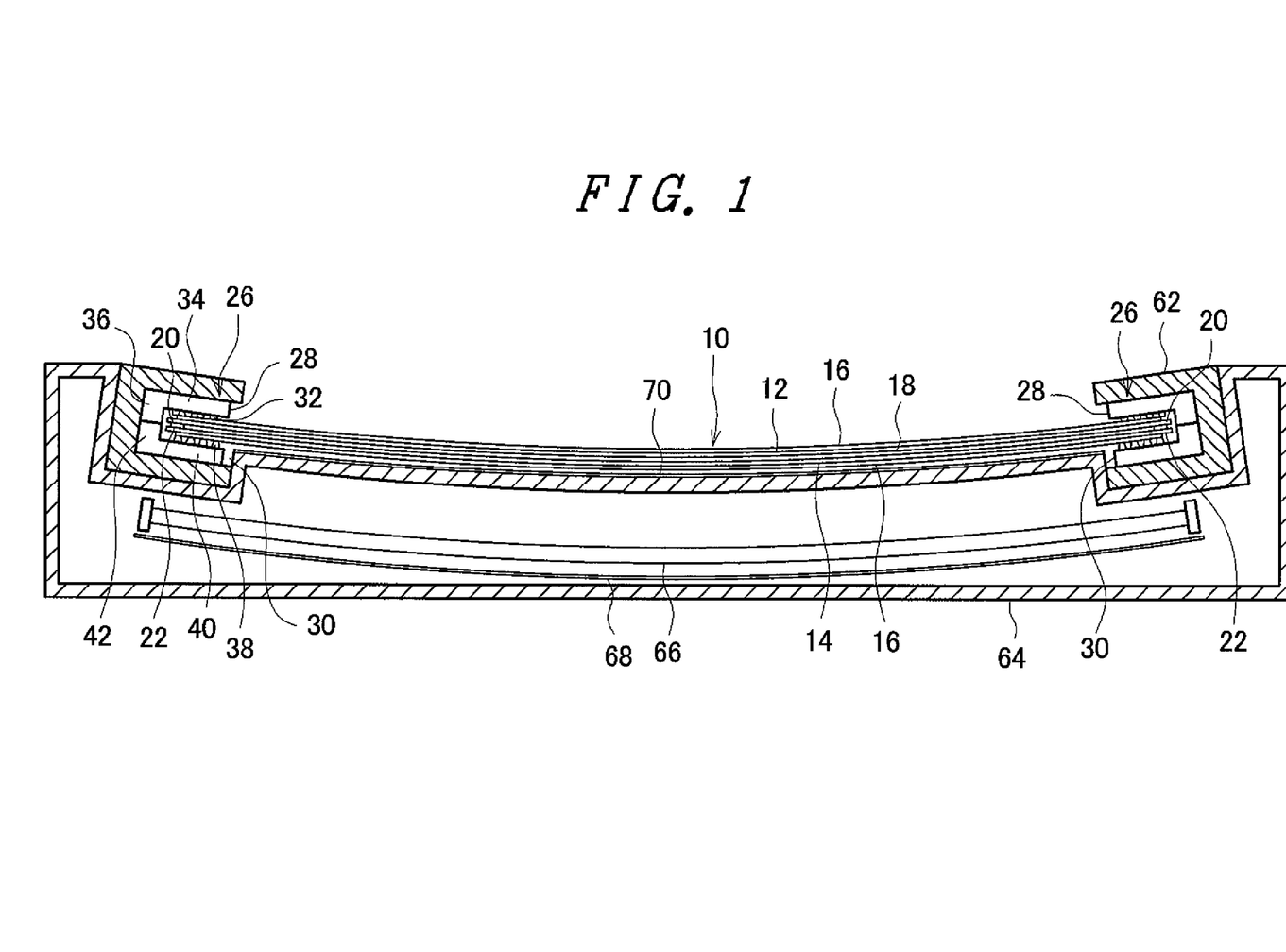
FIG. 1 is a cross-sectional view showing a liquid crystal display device according to an embodiment of the present invention.
Figure 2:
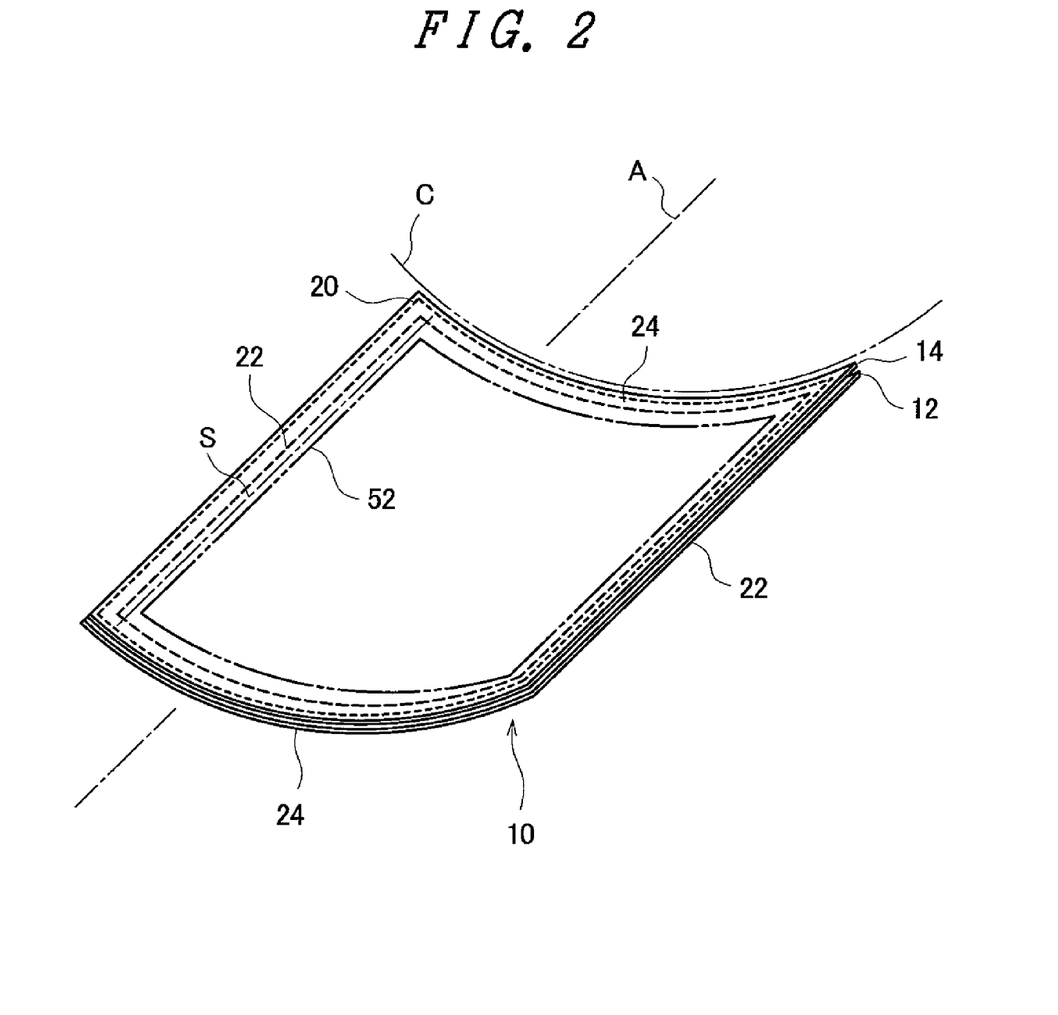
FIG. 2 is a perspective view showing a liquid crystal display panel.

FIG. 1 is a cross-sectional view showing a liquid crystal display device according to an embodiment of the present invention. The liquid crystal display device includes a liquid crystal display panel 10. FIG. 2 is a perspective view showing the liquid crystal display panel 10.

The liquid crystal display panel 10 includes a first substrate 12 and a second substrate 14. The first substrate 12 and the second substrate 14 are formed of a glass substrate respectively and have a thickness which allows both substrates 12, 13 to be bendable. One of the first substrate 12 and the second substrate 14 is a Thin Film Transistor (TFT) substrate on which TFTs, lines and the like not shown in the drawing are formed, and the other of the first substrate 12 and the second substrate 14 is a color filter substrate which includes a colored layer not shown in the drawing. As shown in FIG. 1, a polarizer 16 is adhered to an outer side of the liquid crystal display panel 10.

Liquid crystal 18 is sealed in a space defined between the first substrate 12 and the second substrate 14. By decreasing a thickness of the first substrate 12 and a thickness of the second substrate 14 by polishing after the liquid crystal 18 is sealed in the space, it is possible to reduce breaking of the first substrate 12 and the second substrate 14.

As shown in FIG. 2, the liquid crystal display panel 10 includes a straight line S on a surface thereof, and is bent along a curved line C which surrounds an axis A parallel to the straight line S (for example, an arc constituting a portion of a circle about the axis A).

Edge portions of the first substrate 12 and edge portions of the second substrate 14 are fixed to each other by a sealing material 20 made of an epoxy resin, for example. The sealing material 20 includes non-bent portions 22 which extend along the straight line S and are not bent and bent portions 24 which extend along the curved line C and are bent. Both the first substrate 12 and the second substrate 14 are not bent at portions thereof where the substrates 12, 14 face the non-bent portion 22 of the sealing material 20, and are bent at portions thereof where the substrates 12, 14 face the bent portion 24 of the sealing material 20.

The liquid crystal display device further includes pressing members 26 which press the first substrate 12 and the second substrate 14 in the direction that the first substrate 12 and the second substrate 14 come closer to each other. The pressing member 26 is constituted of a first pressing member 28 and a second pressing member 30.

Figure 3A:
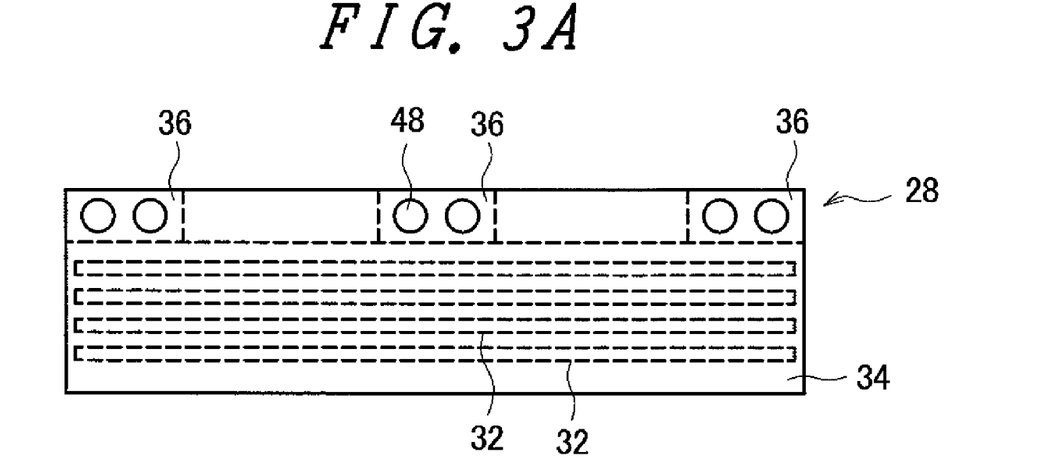
FIG. 3A is a plan view of the first pressing member and FIG. 3B is a front view of the first pressing member.
Figure 3B:
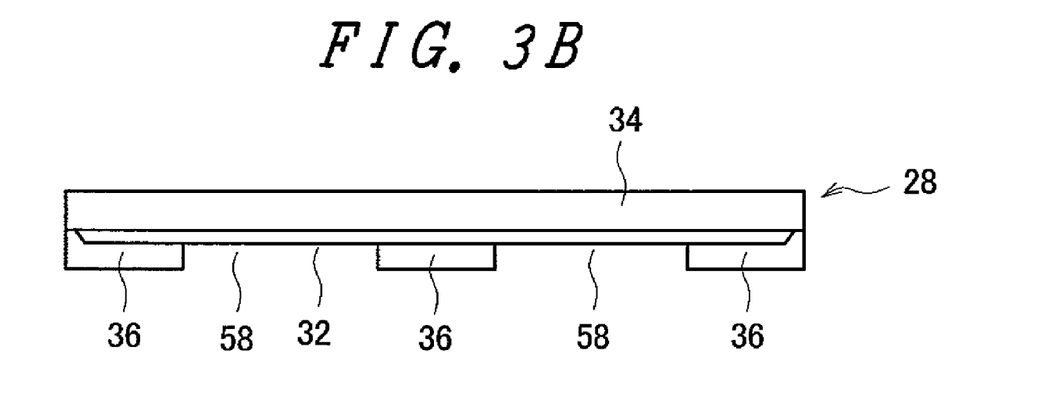
Figure 4A:
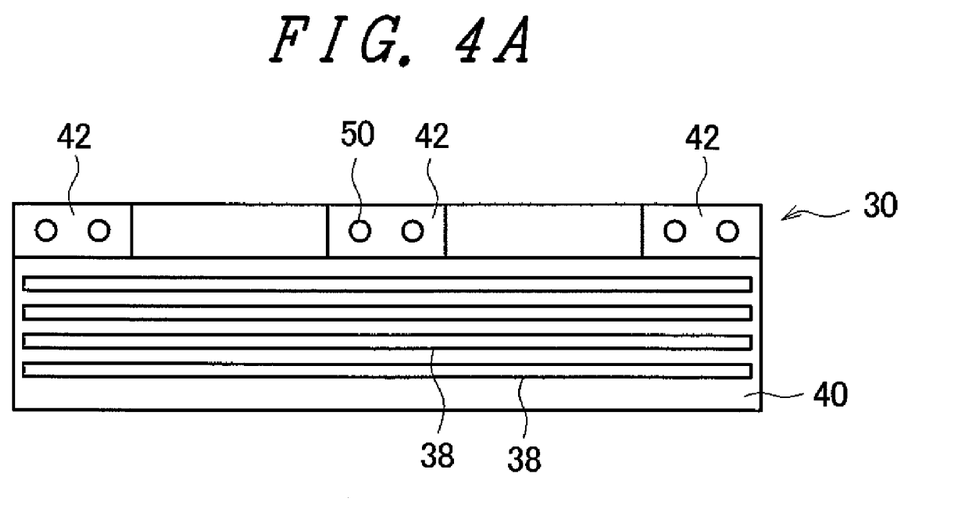
FIG. 4A is a plan view of the second pressing member and FIG. 4B is a front view of the second pressing member.
Figure 4B:
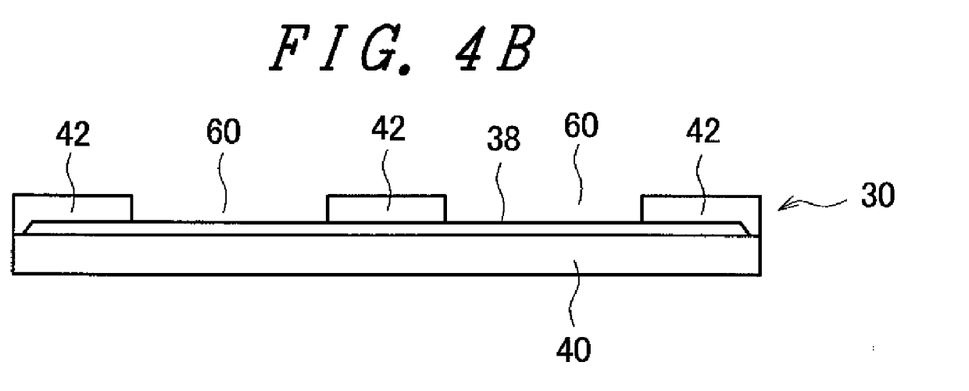
Figure 5:
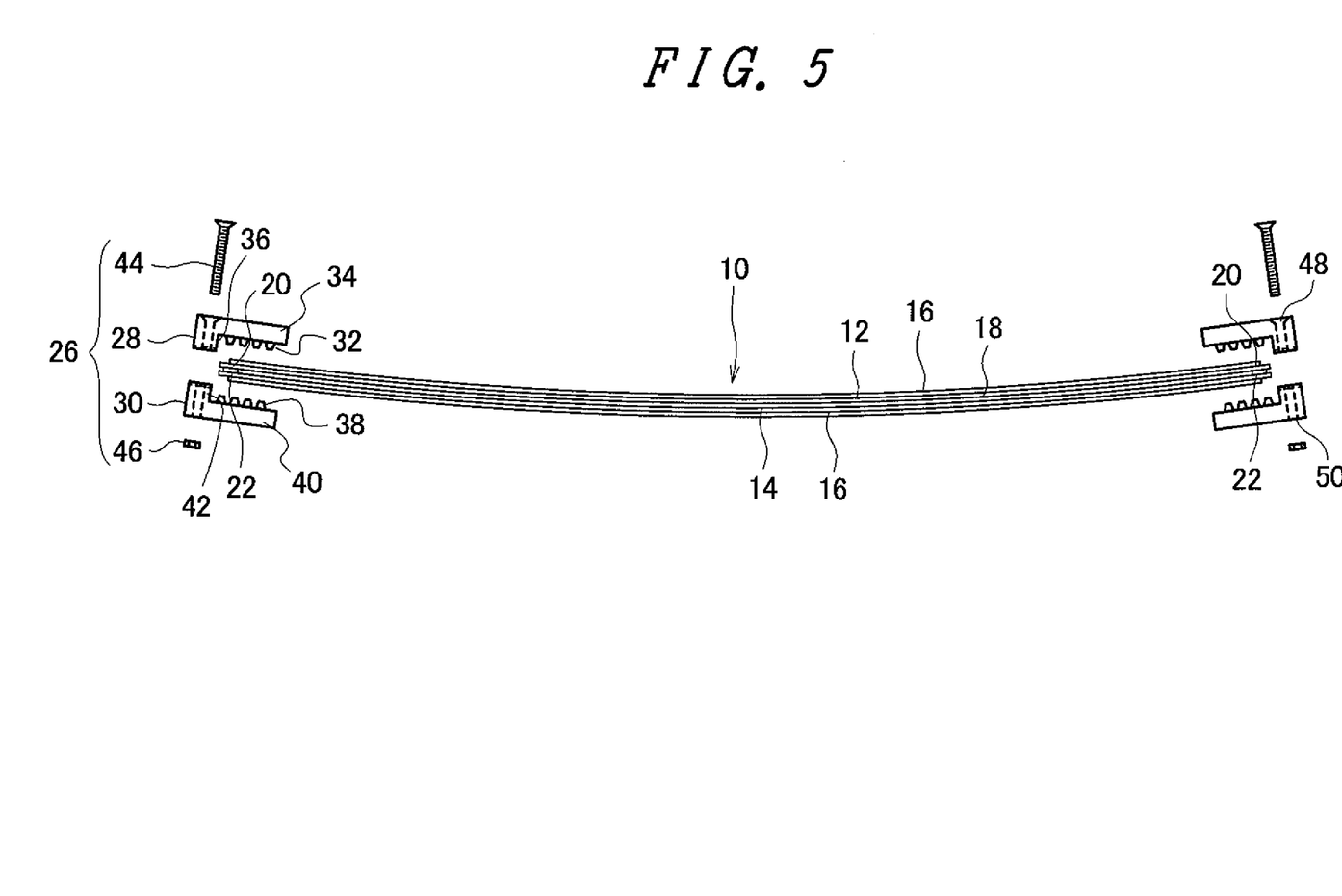
FIG. 5 is an exploded view of the pressing members.

FIG. 3A is a plan view of the first pressing member 28 and FIG. 3B is a front view of the first pressing member 28. FIG. 4A is a plan view of the second pressing member 30 and FIG. 4B is a front view of the second pressing member 30. FIG. 5 is an exploded view of the pressing members 26.

The first pressing member 28 includes a plurality of first contact portions 32 which are brought into contact with the first substrate 12. The first contact portion 32 has a projecting ridge shape (rail shape). Accordingly, the first contact portion 32 is brought into contact with the first substrate 12 in a line contact or in a state similar to a line contact. The plurality of first contact portions 32 are formed on a first support portion 34. The first support portion 34 faces the first substrate 12 in an opposed manner by way of the plurality of first contact portions 32. First connection portions 36 are formed on the first support portion 34. To be more specific, the plurality of first connection portions 36 are formed as projecting portions projecting from the first support portion 34.

The second pressing member 30 includes a plurality of second contact portions 38 which are brought into contact with the second substrate 14. The second contact portion 38 has a projecting ridge shape (a rail shape). Accordingly, the second contact portion 38 is brought into contact with the second substrate 14 in a line contact or a state similar to a line contact. The plurality of second contact portions 38 are formed on a second support portion 40. The second support portion 40 faces the second substrate 14 in an opposed manner by way of the plurality of second contact portions 38. Second connection portions 42 are formed on the second support portion 40. To be more specific, the plurality of second connection portions 42 are formed as projecting portions projecting from the second support portion 40.

With the provision of the first connection portions 36 and the second connection portions 42, the first support portion 34 and the second support portion 40 are connected to each other with a pressing force applied in the direction that the first support portion 34 and the second support portion 40 come closer to each other. In an example shown in FIG. 5, bolts 44 and nuts 46 are used for connecting the first connection portions 36 and the second connection portions 42 respectively. To be more specific, the bolt 44 is inserted into a through hole 48 formed in the first connection portion 36 and a through hole 50 formed in the second connection portion 42 and, thereafter, the nut 46 is fastened to the bolt 44.

The pressing members 26 press the first substrate 12 and the second substrate 14 in regions defined between the non-bent portions 22 of the sealing material 20 and a display region 52 (see FIG. 2) of the liquid crystal display panel 10 (regions avoiding the display region 52). The pressing members 26 may press the sealing material 20 or may press the first substrate 12 and the second substrate 14 while avoiding the sealing material 20.

According to this embodiment, the pressing members 26 press the first substrate 12 and the second substrate 14 in the regions near the sealing material 20 and hence, it is possible to prevent lowering of characteristics of the liquid crystal display device when the liquid crystal display panel 10 is bent.

Figure 6:
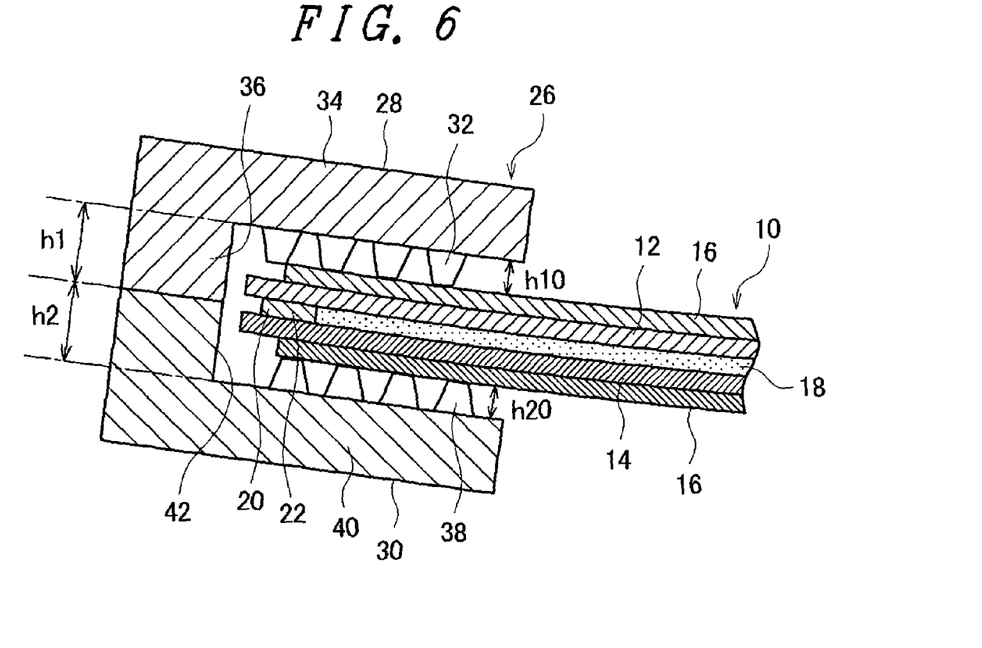
FIG. 6 is an enlarged cross-sectional view of a portion of the liquid crystal display panel and the pressing members which press the liquid crystal display panel.

FIG. 6 is an enlarged cross-sectional view of a portion of the liquid crystal display panel 10 and the pressing member 26 which presses the liquid crystal display panel 10. In this embodiment, a thermal expansion coefficient of the first contact portions 32 and the second contact portions 38 and a thermal expansion coefficient of the connection portions (the first connection portion 36 and the second connection portion 42) are set different from each other.

For example, assume a height of the first connection portion 36 as $h_1$ and a height of the second connection portion 42 as $h_2$ when a temperature is t° C. Also assume a thermal expansion coefficient of the first connection portion 36 and the second connection portion 42 as α. When the temperature is increased to T° C. from t° C., an increased amount of the height of the first connection portion 36 is expressed by $\alpha(T-t)h_1$, and an increased amount of the height of the second connection portion 42 is expressed by $\alpha(T-t)h_2$. Accordingly, an expansion amount of a distance $(h_1+h_2)$ between the first support portion 34 and the second support portion 40 is expressed by a following formula.

$$\alpha(T-t)h_1+\alpha(T-t)h_2=\alpha(T-t)(h_1+h_2).$$

On the other hand, assume a height of the first contact portion 32 as $h_{10}$ and a height of the second contact portion 38 as $h_{20}$ when a temperature is t° C. Assume that a thermal expansion coefficient of the first contact portions 32 and the second contact portions 38 is $\alpha$ in the same manner as the first connection portions 36 and the second connection portions 42, when a temperature is increased to T° C. from t° C., an increased amount of a height of the first contact portion 32 is expressed by $\alpha(T-t)h_{10}$, and an increased amount of a height of the second contact portion 38 is expressed by $\alpha(T-t)h_{20}$. Accordingly, a sum of the increased amount of the height of the first contact portion 32 and the increased amount of the height of the second contact portion 38 is expressed by a following formula.

$$\alpha(T-t)h_{10}+\alpha(T-t)h_{20}=\alpha(T-t)(h_{10}+h_{20}).$$

Here, when the relationship of $\alpha(T-t)(h_{10}+h_{20})=\alpha(T-t)(h_1+h_2)$ is satisfied, a pressing force of the pressing member 26 is constant irrespective of a temperature change. However, as can be clearly understood from FIG. 6, the sum $(h_{10}+h_{20})$ of the height of the first contact portion 32 and the height of the second contact portion 38 is smaller than the distance $(h_1+h_2)$ between the first support portion 34 and the second support portion 40 by an amount of a thickness of the liquid crystal display panel 10. Accordingly, when a temperature is increased to T° C. from t° C., the relationship of $\alpha(T-t)(h_{10}+h_{20})<\alpha(T-t)(h_1+h_2)$ is established. Accordingly, a pressing force of the pressing member 26 is decreased thus lowering an advantageous effect acquired by pressing the second substrate 14.

In view of the above, in this embodiment, the thermal expansion coefficient of the first contact portions 32 and the second contact portions 38 is set to a thermal expansion coefficient $\beta$ which is larger than the thermal expansion coefficient $\alpha$ of the connection portions (first connection portion 36 and second connection portion 42). For example, the first contact portions 32 and the second contact portions 38 are made of aluminum, and the first connection portions 36 and the second connection portions 42 are made of stainless. Here, the first connection portions 36 and the first support portion 34 may be integrally formed using the same material, and the second connection portions 42 and the second support portion 40 may be integrally formed using the same material. According to this embodiment, it is possible to decrease a change of the pressing force caused by a temperature change. Particularly, when the relationship of $\beta(T-t)(h_{10}+h_{20})=\alpha(T-t)(h_1+h_2)$ is satisfied, a pressing force of the pressing member 26 can be set constant irrespective of a temperature change.

Figure 7:
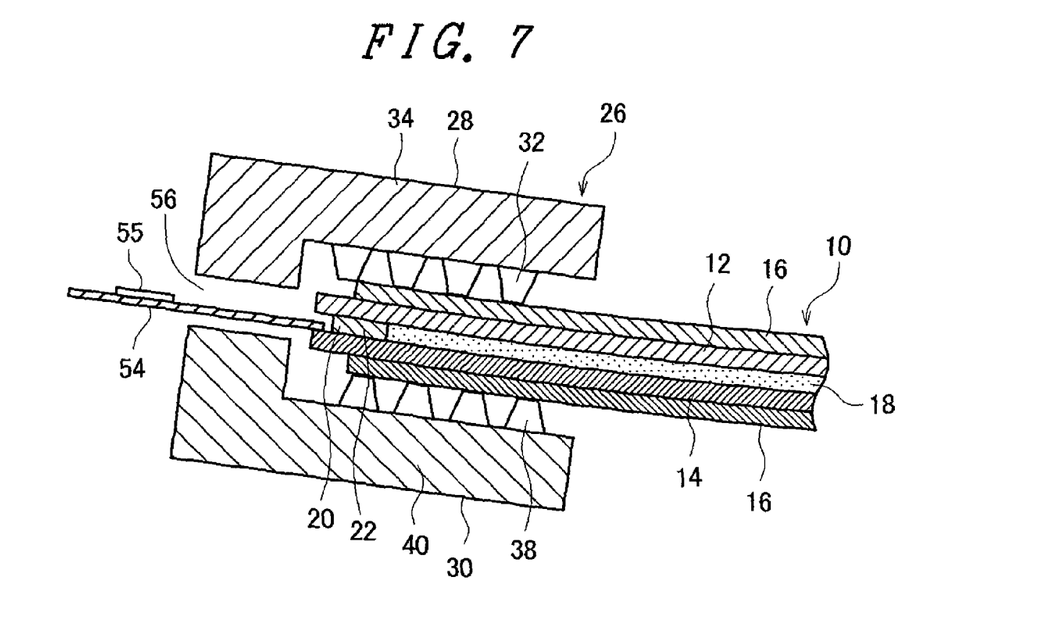
FIG. 7 is an enlarged cross-sectional view of a portion of the liquid crystal display panel and the pressing members which press the liquid crystal display panel as viewed from another position.

FIG. 7 is an enlarged cross-sectional view of a portion of the liquid crystal display panel 10 and the pressing member 26 which presses the liquid crystal display panel 10 as viewed from another position.

A flexible printed circuit board 54 is mounted on the liquid crystal display panel 10. Electrodes (not shown in the drawing) formed on the liquid crystal display panel 10 and electrodes (not shown in the drawing) formed on the printed circuit board 54 are electrically connected to each other. A chip part 55 such as an IC chip is mounted on the flexible printed circuit board 54. The pressing member 26 includes holes 56 for preventing the pressing member 26 from pressing the flexible printed circuit board 54. Each hole 56 is formed by combining a recessed portion 58 formed between the neighboring first connection portions 36 (see FIG. 3B) and a recessed portion 60 formed between the neighboring second connection portions 42 (see FIG. 4B).

As shown in FIG. 1, the liquid crystal display device includes an upper frame 62 which holds the pressing members 26. The upper frame 62 is held by a lower frame 64. A backlight 66, a reflection sheet 68, a diffusion plate 70 and the like are arranged on the lower frame 64.

[Modification]

Figure 8A:
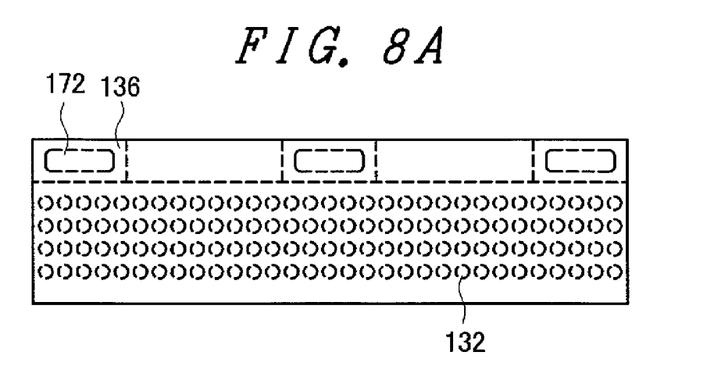
FIG. 8A is a plan view of the first pressing member and FIG. 8B is a front view of the first pressing member.
Figure 8B:
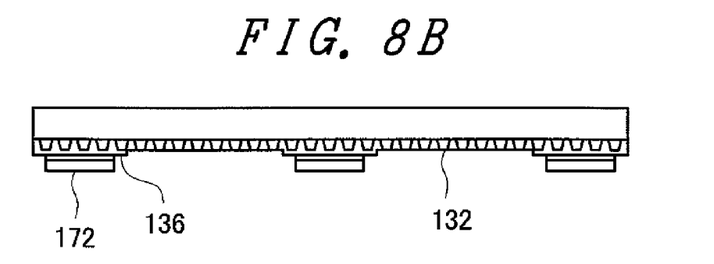
Figure 9A:
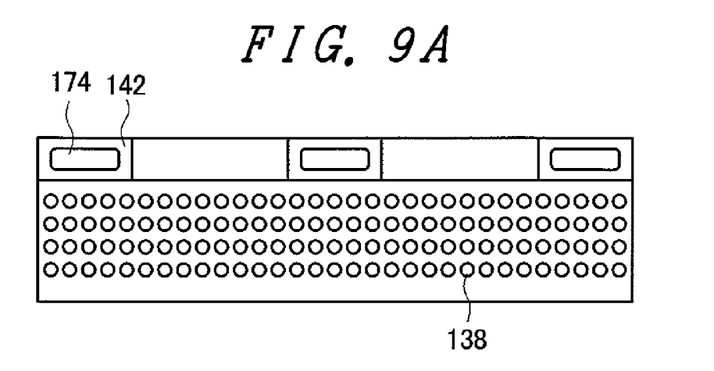
FIG. 9A is a plan view of the second pressing member and FIG. 9B is a front view of the second pressing member.
Figure 9B:
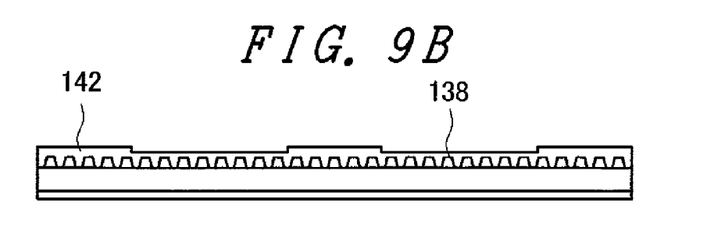

FIG. 8A is a plan view of a first pressing member according to the modification of the present invention, and FIG. 8B is a front view of the first pressing member according to the modification of the present invention. FIG. 9A is a plan view of a second pressing member according to the modification of the present invention, and FIG. 9B is a front view of the second pressing member according to the modification of the present invention.

In this modification, first contact portions 132 and second contact portions 138 have a projecting shape (projecting columnar shape) respectively. Accordingly, the first contact portions 132 and the second contact portions 138 are brought into contact with a first substrate 12 and a second substrate 14 (see the above-mentioned embodiments) respectively in a point contact or in a state similar to a point contact. A plurality of first contact portions 132 are arranged in a matrix array consisting of plural rows and plural columns, while the plurality of second contact portions 138 are arranged in a matrix array consisting of plural rows and plural columns.

Further, projecting portions 172 are formed on either one of first connection portions 136 and second connection portions 142, and recessed portions 174 are formed on the other of the first connection portions 136 and the second connection portions 142. By engaging the projecting portions 172 with the recessed portions 174 by fitting, the first connection portions 136 and the second connection portions 142 are connected to each other. In this manner, this embodiment uses neither bolts nor nuts in connecting the first connection portions 136 and the second connection portions 142 to each other. With respect to other constitutional parts of this embodiment, the explanation which has been made in the above-mentioned embodiments with respect to the corresponding constitutional parts is applicable. Further, a known technique is also applicable to this embodiment.

Figure 10:
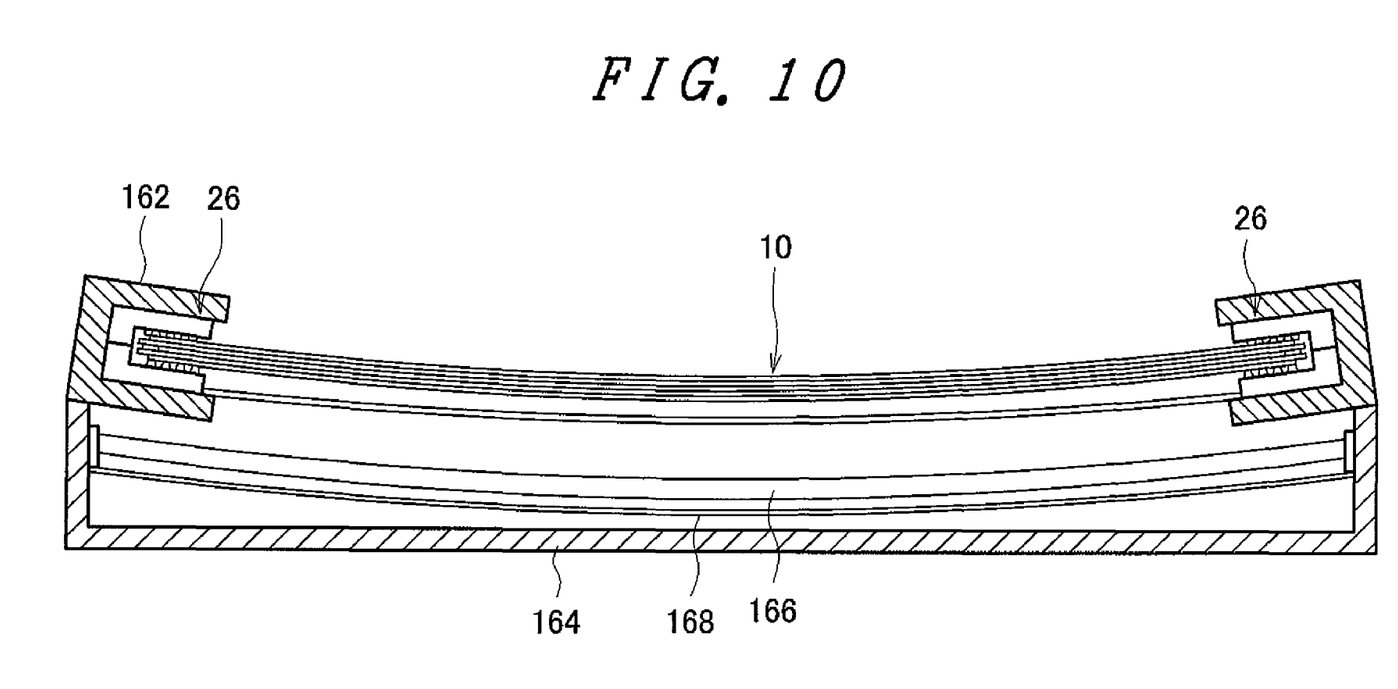
FIG. 10 is a cross-sectional view showing a liquid crystal display device according to the modification.

FIG. 10 is a cross-sectional view showing a liquid crystal display device according to a modification of the present invention. In this modification, an upper frame 162 overlaps a lower frame 164 which houses a backlight 166 and a reflection sheet 168 therein. Although not shown in the drawing, the upper frame 162 and the lower frame 168 are fixed to each other by tacky adhesion which uses an adhesive tape, adhesion which uses an adhesive material, fitting engagement, thread engagement which uses bolts or the like, for example.

A liquid crystal display device which adopts the present invention is applicable to a gaming machine, for example. The present invention is not limited to the above-mentioned embodiments and various modifications are conceivable. For example, the constitutions explained in the above-mentioned embodiments are replaceable with the constitution substantially equal to the above-mentioned constitutions, the constitutions by which the same manner of operation and advantageous effects can be obtained, or the constitutions which can achieve the same object as the above-mentioned embodiments.

What is claimed is:

1. A liquid crystal display device comprising:
a bent liquid crystal display panel which includes a first substrate and a second substrate which are fixed to each other by a sealing material, and liquid crystal which is hermetically filled in a space defined between the first substrate and the second substrate; and
pressing members which press the first substrate and the second substrate in the direction that the first substrate and the second substrate come closer to each other, wherein
the liquid crystal display panel includes a straight line on a surface thereof and is bent along a bent line which surrounds an axis arranged parallel to the straight line,
the sealing material includes non-bent portions which extend along the straight line and are not bent, and bent portions which extend and are bent along the bent line, and
the pressing members press the first substrate and the second substrate in regions defined between the non-bent portions of the sealing material and a display region of the liquid crystal display panel.

2. A liquid crystal display device according to claim 1, wherein the pressing member includes: a plurality of first contact portions which are brought into contact with the first substrate; a plurality of second contact portions which are brought into contact with the second substrate; and a support portion which supports the plurality of first contact portions and the plurality of second contact portions.

3. A liquid crystal display device according to claim 2, wherein each one of the plurality of first contact portions and each one of the plurality of second contact portions have a projection shape.

4. A liquid crystal display device according to claim 2, wherein each one of the plurality of first contact portions and each one of the plurality of second contact portions have a projecting ridge shape.

5. A liquid crystal display device according to claim 4, wherein the support portion includes: a first support portion which faces the first substrate in an opposed manner by way of the plurality of first contact portions; a second support portion which faces the second substrate in an opposed manner by way of the plurality of second contact portions; and a connection portion which connects the first support portion and the second support portion with a pressing force applied in the direction that the first support portion and the second support portion come closer to each other, and
a thermal expansion coefficient of the plurality of first contact portions and the plurality of second contact portions is set larger than a thermal expansion coefficient of the connection portion.

6. A liquid crystal display device according to claim 5, further comprising a flexible printed circuit board which is mounted on the liquid crystal display panel, and
the pressing member has holes for preventing the pressing member from pressing the flexible printed circuit board.

* * * * *